(12) United States Patent
Walters et al.

(10) Patent No.: US 7,967,379 B2
(45) Date of Patent: Jun. 28, 2011

(54) SEAT WITH INDEPENDENTLY ADJUSTABLE USER SUPPORT ASSEMBLIES

(75) Inventors: Joseph L. Walters, Goshen, IN (US); Dana E. Lockwood, Elkhart, IN (US); Robert Ripplinger, Bristol, IN (US); James A. Riegsecker, White Pigeon, MI (US)

(73) Assignee: L&P Property Management Company, South Gate, CA (US)

( * ) Notice: Subject to any disclaimer, the term of this patent is extended or adjusted under 35 U.S.C. 154(b) by 206 days.

(21) Appl. No.: 12/345,145

(22) Filed: Dec. 29, 2008

(65) Prior Publication Data
US 2010/0164266 A1 Jul. 1, 2010

(51) Int. Cl.
*A47C 7/02* (2006.01)
(52) U.S. Cl. ........... 297/284.3; 297/284.4; 297/284.7; 297/284.9; 297/353; 297/410
(58) Field of Classification Search .... 297/284.1–284.9, 297/311, 337, 353, 410, 411.36
See application file for complete search history.

(56) References Cited

U.S. PATENT DOCUMENTS

| 3,059,971 | A | * | 10/1962 | Becker | 297/353 |
| 4,161,337 | A | * | 7/1979 | Ross et al. | 297/230.12 |
| 4,500,136 | A | * | 2/1985 | Murphy et al. | 297/284.9 |
| 4,647,066 | A | * | 3/1987 | Walton | 297/284.1 |
| 4,732,423 | A | * | 3/1988 | Condon | 297/284.1 |
| 4,981,325 | A | * | 1/1991 | Zacharkow | 297/284.1 |
| 5,035,466 | A | * | 7/1991 | Mathews et al. | 297/337 |
| 5,112,106 | A | * | 5/1992 | Asbjornsen et al. | 297/284.7 |
| 5,228,747 | A | * | 7/1993 | Greene | 297/284.3 |
| 5,366,277 | A | * | 11/1994 | Tremblay | 297/464 |
| 5,370,443 | A | | 12/1994 | Maruyama | |
| 5,649,741 | A | | 7/1997 | Beggs | |
| 5,704,689 | A | | 1/1998 | Kim | |
| 6,478,379 | B1 | | 11/2002 | Ambasz | |
| 6,540,300 | B2 | * | 4/2003 | Piretti | 297/411.35 |
| 6,589,143 | B2 | * | 7/2003 | Taylor | 482/134 |
| 6,626,494 | B2 | * | 9/2003 | Yoo | 297/296 |
| 6,802,566 | B2 | * | 10/2004 | Prince et al. | 297/411.37 |
| 6,843,530 | B1 | * | 1/2005 | Wu | 297/284.4 |
| 6,938,956 | B1 | * | 9/2005 | Piretti | 297/284.7 |
| 6,945,601 | B1 | | 9/2005 | Wu | |
| 7,040,703 | B2 | | 5/2006 | Sanchez | |
| 7,232,174 | B1 | * | 6/2007 | Trott | 296/65.17 |
| 7,273,252 | B2 | * | 9/2007 | Iijima et al. | 297/284.3 |
| 7,625,046 | B2 | * | 12/2009 | Sanchez | 297/353 |
| 2002/0043841 | A1 | * | 4/2002 | Giacinto | 297/284.4 |
| 2008/0067850 | A1 | | 3/2008 | Stenstrom et al. | |

FOREIGN PATENT DOCUMENTS

WO WO 8909557 A1 * 10/1989

\* cited by examiner

*Primary Examiner* — Laurie K Cranmer
(74) *Attorney, Agent, or Firm* — Shook Hardy & Bacon, LLP

(57) ABSTRACT

A seat including a plurality of user support assemblies that are independently adjustable. User support assemblies, which are independently adjustable, include a head support assembly, a thoracic support assembly, and a lumbar support assembly. Moreover, the seat might include a independently adjustable seat assembly.

14 Claims, 6 Drawing Sheets

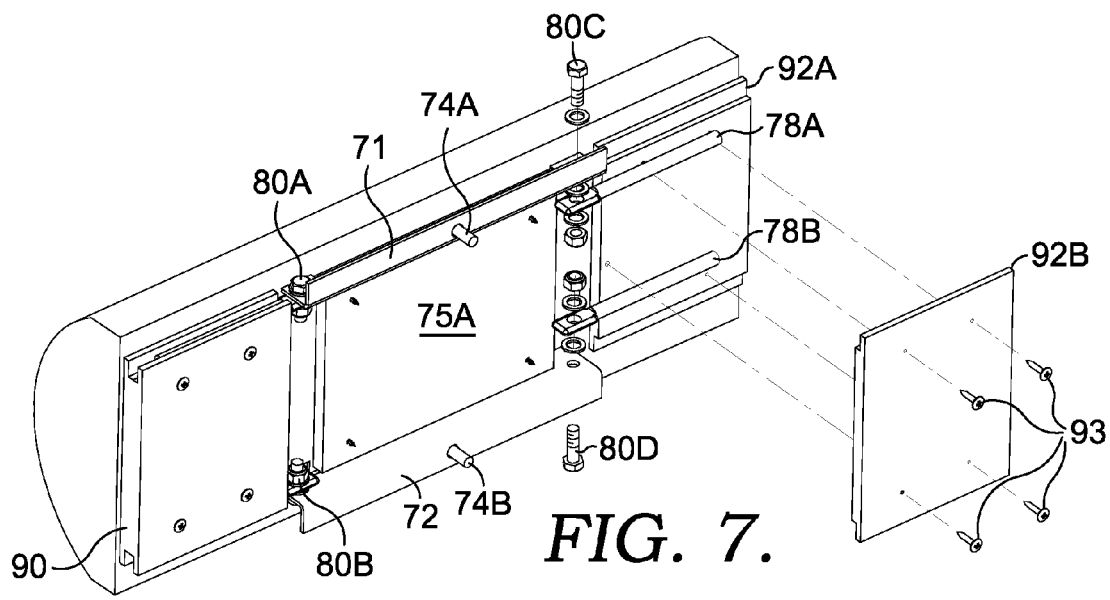
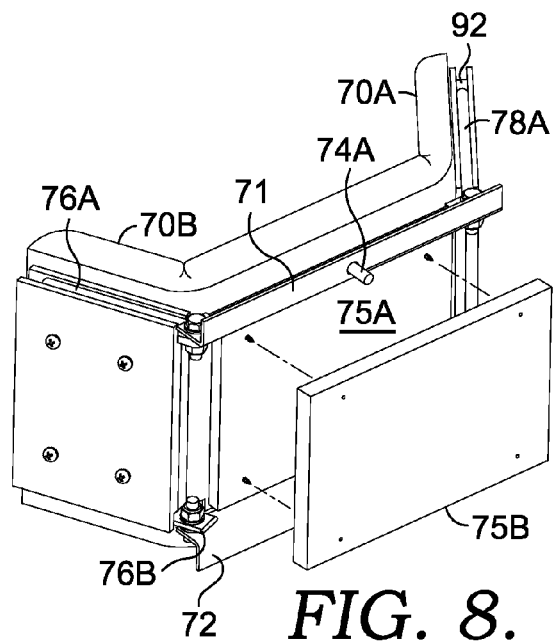
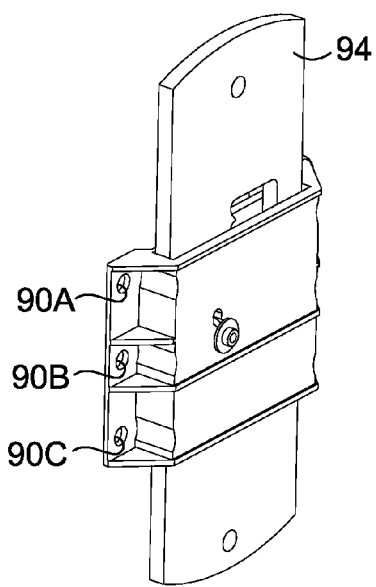

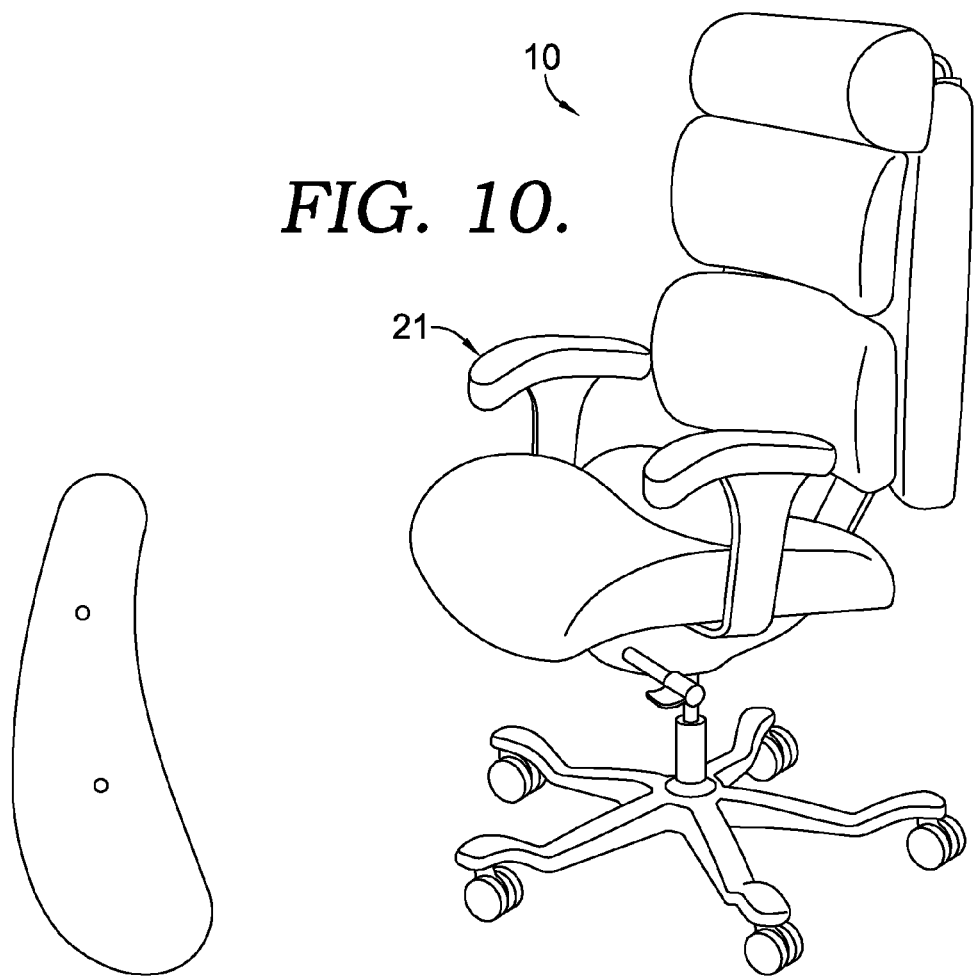
FIG. 10.
FIG. 11A.
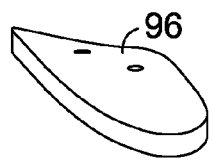
FIG. 11B.
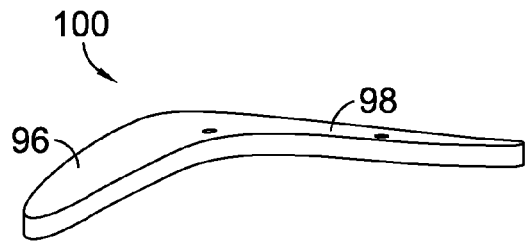
FIG. 11C.

SEAT WITH INDEPENDENTLY ADJUSTABLE USER SUPPORT ASSEMBLIES

BACKGROUND

Various adjustable seats are known in the art. For example, some chairs include a seat frame that can adjust vertically to be positioned either higher off or closer to the ground. However, anthropometric measurements vary widely between users. Accordingly, even though chairs can be adjustable in certain respects, a user must select from a variety of chair sizes to find the chair size that best accommodates the user's needs.

SUMMARY

There is now presented and disclosed a seat including a plurality of user support assemblies that are independently adjustable. For example, a chair may include a head support assembly, a thoracic support assembly, and a lumbar support assembly, all of which are independently, vertically adjustable to fit a user's height and spinal curvature. In addition, a chair may include a horizontally-adjustable seat assembly to customize a sitting surface depth according to a user's leg length (from hip to knee). Furthermore, user support assemblies of the chair may include crescent-shaped cushions to better fit contours of a users body. In addition, user support assemblies may include rotatable sides to adjust to a width of a user's body.

One of several objectives of the present invention is to satisfy the need for a seat that fits the anthropometric measurements of users covering a large percentile range for men and women. Another objective of the present invention includes providing a chair design in which mechanisms for adjustment are at least partially hidden from view.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

Embodiments of the present invention are described in detail below with reference to the attached drawing figures, wherein:

FIG. 7 is a partially exploded view of a user support assembly;

FIG. 8 is a view similar to FIG. 7, illustrating rotational side portions;

FIG. 9 is an enlarged view of an adjustment mechanism of FIG. 5;

FIG. 10 is a view of a chair with independently-adjustable user supports and armrests; and FIGS. 11A-11C illustrate views of a top support surface of a right armrest, wherein 11A is a top view, 11B is a front view, and 11C is a side view.

DETAILED DESCRIPTION

Figure 1:
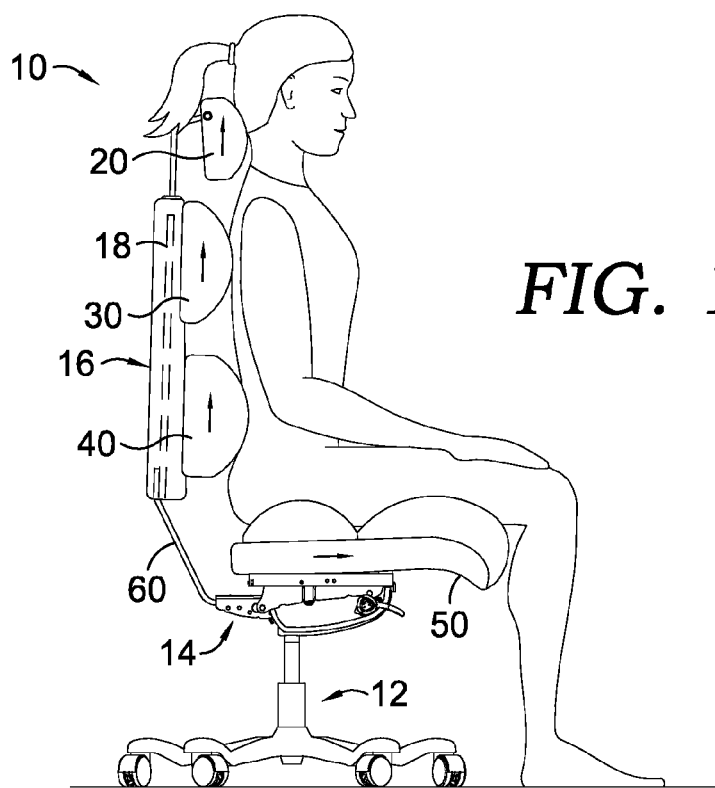
FIG. 1 is a side view of a chair with independently-adjustable user support assemblies, wherein arrows indicate that assemblies coupled to the back have been adjusted upward and a seat member has been adjusted forward.

In a first embodiment, a chair 10 is equipped with multiple independently-adjustable user supports. As is known, a chair 10 might typically be equipped with a pedestal base 12 supported by rollers. The pedestal base 12 supports a chair seat 14 and back 16. The back 16 might be attached to the chair seat 14. The chair 10 may also be provided with a pair of arm rests 21 (as shown in FIG. 10). Although the chair 10 illustrated in various figures includes an office-type chair, embodiments of the present invention include use with a variety of seating types. For example, the present invention might also be applied to other types of chairs and home seating, e.g., bench, recliner, couch, sofa, etc. Moreover the present invention might be applied to various types of seating used in transit, such as in an airplane, automobile, bus, train, etc.

Figure 2:
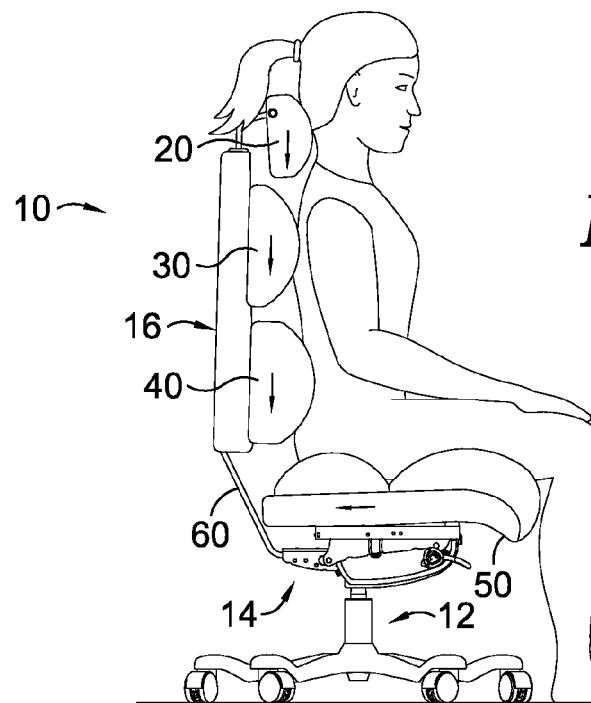
FIG. 2 is a view similar to FIG. 1, wherein arrows indicate that assemblies coupled to the back have been adjusted downward and a seat member has been adjusted backward.

With reference to FIGS. 1 and 2, one of several embodiments of chair 10 will be described generally. As seen, the back 16 includes independently, vertically-adjustable support assemblies 20, 30, and 40 to support various portions of user's body. For example, the back 16 includes a head support assembly 20 for supporting a user's neck and head, a thoracic support assembly 30 for supporting a user's thoracic (mid-back and upper-back) spinal region, and a lumbar support assembly 40 for supporting the user's lumbar (low-back) spinal region. Furthermore, the chair seat chassis 14 may include a horizontally-adjustable seat assembly 50 to modify a seat depth of the chair. Arrows in FIGS. 1 and 2 indicate a direction in which the individual support assemblies can be adjusted. Arrows on the head support assembly 20, the thoracic support assembly 30, and the lumbar support assembly 40 indicate that those assemblies are vertically adjustable up and down. An arrow on the seat assembly 50 indicates that the assembly is horizontally adjustable forward and backward.

Various embodiments of the invention will now be described in more detail. Referring to FIGS. 1-6, the back 16 is coupled to the chair seat chassis 14 by a mounting plate 60. FIG. 5 illustrates that mounting plate 60 is angled and includes holes in one end for receiving fasteners for attachment to the chair seat chassis 14. For example mounting plate 60 may be bolted to the chair seat chassis 14. The back 16 is coupled to the other end of the mounting plate 60. In one embodiment, as can be seen in FIGS. 1, 5, and 6, the back 16 includes a central mounting base 18 rigidly coupled to the mounting plate 60. The mounting plate 60 may be coupled to the back surface of the central mounting base 18 by screws, bolts, or any other appropriate fastening device. Alternatively, the mounting plate 60 and central mounting base 18 may be integrally constructed. The mounting plate 60 is angled and supports the back 16 in an upright position relative to the chair seat chassis 14. In other aspects, the back 16 might be coupled to other portions of the chair 10, underneath seat assembly 50.

Among other things, the central mounting base 18 serves as a primary support component of the back 16 as it provides rigidity and serves as a foundation to which other components may be coupled. In one embodiment the central mounting base 18 is a rigid plate with dimensions that enable it to be positioned at least partially hidden inside the back 16 of the chair. Various arrangements enable the central mounting base 18 to be at least partially hidden including, but not limited to, encasing the central mounting base 18 inside a foam slip cover 19. As illustrated in FIG. 5, the foam slip cover 19 includes holes 22 and 24 to provide access for other components to be coupled to the central mounting base 18. The central mounting base 18 may be constructed of any type of rigid material that will support other components such as, but not limited to, wood, plastic, and pressure-formed gumwood laminate.

As illustrated in FIG. 5, adjustable mechanisms 32 and 42 are coupled to the central mounting base 18. One type of such adjustable mechanism (shown in FIG. 9) is described in U.S. Pat. No. 5,649,741, which is hereby incorporated herein by reference. A lumbar support adjustment mechanism 42 is coupled to the central mounting base 18 by a series of fasteners 45A-D, such as bolts or screws. The fasteners 45A-D extend through a plurality of holes (see, e.g., FIG. 9, 90A-C) and into the central mounting base 18. The central mounting base 18 may include t-nuts (not shown) seated therein to receive the fasteners 45A-D. The lumbar support adjustment mechanism 42 attaches to the central mounting base 18 through hole 24 in the foam slip cover 19. Coupled in between the lumbar support adjustment mechanism 42 and the central mounting base 18 are one or more support blocks 44. Support blocks 44 position the lumbar support adjustment mechanism 42 away from a surface of the central mounting base 18. Such positioning both enables a sliding plate 94A to slide unobstructedly past the foam slip cover 19 and properly aligns the support assembly with a corresponding region of a user's back. Support blocks 44 might vary in thickness depending on the amount of space desired between a chair back and support assembly. A thoracic support adjustment mechanism 32 is coupled to central mounting base 18 in a similar fashion to the lumbar support adjustment mechanism 42. However, the thoracic support adjustment mechanism 32 is coupled to the central mounting base 18 through hole 22 of the slip cover 19. In addition, spacers 34 are coupled between the thoracic support adjustment mechanism 32 and the central mounting base 18. Spacers 34 position the thoracic support adjustment mechanism away from a surface of the central mounting base 18. Similar to support blocks 44, spacers 34 also function to properly align a support assembly with a region of a user's back and might vary in thickness. As briefly described previously, adjustment mechanisms 32 and 42 include a sliding member 94A and 94B, which enable support assemblies coupled thereto to slidably adjust near parallel to the back 16.

FIGS. 5, 7 and 8 illustrate components of both a lumbar support assembly 40 and a thoracic support assembly 30. The lumbar support assembly 40 and the thoracic support assembly 30 include a top central mounting bracket 71 and a bottom central mounting bracket 72. Both the top central mounting bracket 71 and bottom central mounting bracket 72 include one or more holes therein for receiving a fastener 74A and 74B (respectively). As illustrated in FIG. 5, the fasteners are attachable to the sliding members 94A and 94B of the adjustment mechanisms 42 and 32 through holes in the sliding members 94A and 94B. Further, support assemblies 30 and 40 comprise a front central skin 75A and a back central skin 75B coupled in-between the top central mounting bracket 71 and bottom central mounting bracket 72. In FIG. 8, the front central skin 75A and back central skin 75B are attachable to one another by a series of fasteners. As shown in FIG. 5, front central skin 75A includes a top lip 82 for engaging the top central mounting bracket 71. In addition, front central skin 75A includes a bottom lip (not shown) for engaging the bottom central mounting bracket 72.

In one embodiment of the present invention, the thoracic support assembly 30 and lumbar support assembly 40 comprise rotatable sides, which are illustrated in FIGS. 7 and 8. Accordingly, the support assemblies 30 and 40 may include one or more left-side swing rods 76A and 76B and one or more right side swing rods 78A and 78B. FIGS. 7 and 8 illustrate left-side swing rod 76A and right-side swing rod 78A coupled to the top central mounting bracket 71 and illustrate left-side swing rod 76B and right-side swing rod 78B coupled to the bottom central mounting bracket 72. Each swing rod includes a hole in one end that corresponds with a hole in a central mounting bracket. Each of fasteners 80A-D is received simultaneously in the corresponding holes of one swing rod and central mounting bracket to rotatably couple the swing rod to the central mounting bracket. Each of fasteners 80A-D function as an axis on which a swing rod may rotate. Fasteners 80A-D may include a combination of a bolt, washers, and locknut.

Furthermore, the support assemblies 30 and 40 may include skins 90 and 92 encasing the one or more left-side swing rods 76A-B and one or more right-side swing rods 78A-B. Skins 90 and 92 may include a front skin plate 92A and a back skin plate 92B coupled together by fasteners such as, but not limited to, screws. By encasing the swing rods, the left side skin 90 can unify rotation of the one or more left side swing rods 76A-B and the right side skin 92 can unify rotation of the one or more right side swing rods 78A and 78B. In one embodiment, the combination of the above-described elements enables rotatable side portions 70A and 70B to include a range of motion from zero degrees to ninety degrees.

Figure 3:
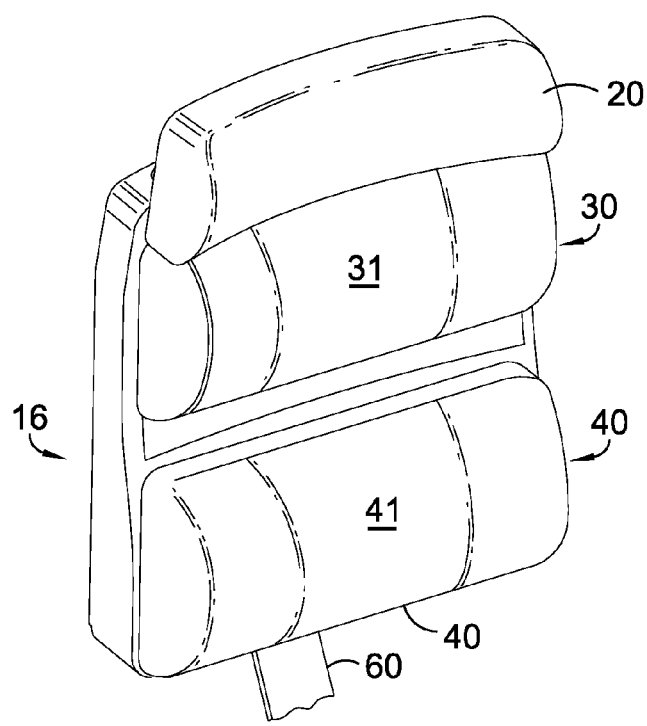
FIG. 3 is a partial view showing a front view of a back of a chair with a head support assembly, a thoracic support assembly, and a lumbar support assembly.
Figure 4:
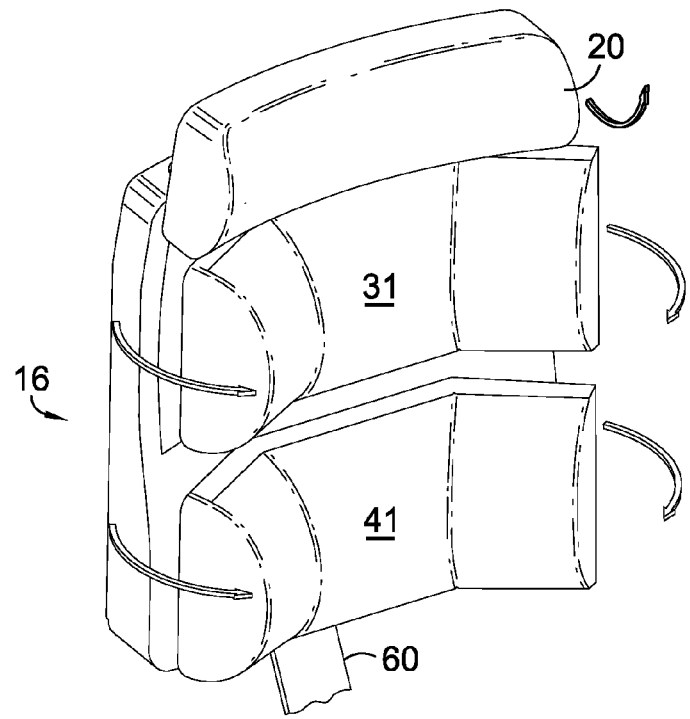
FIG. 4 is a view similar to FIG. 3, wherein arrows illustrate a direction of motion of rotational side portions and a direction of motion of a head support assembly.
Figure 5:
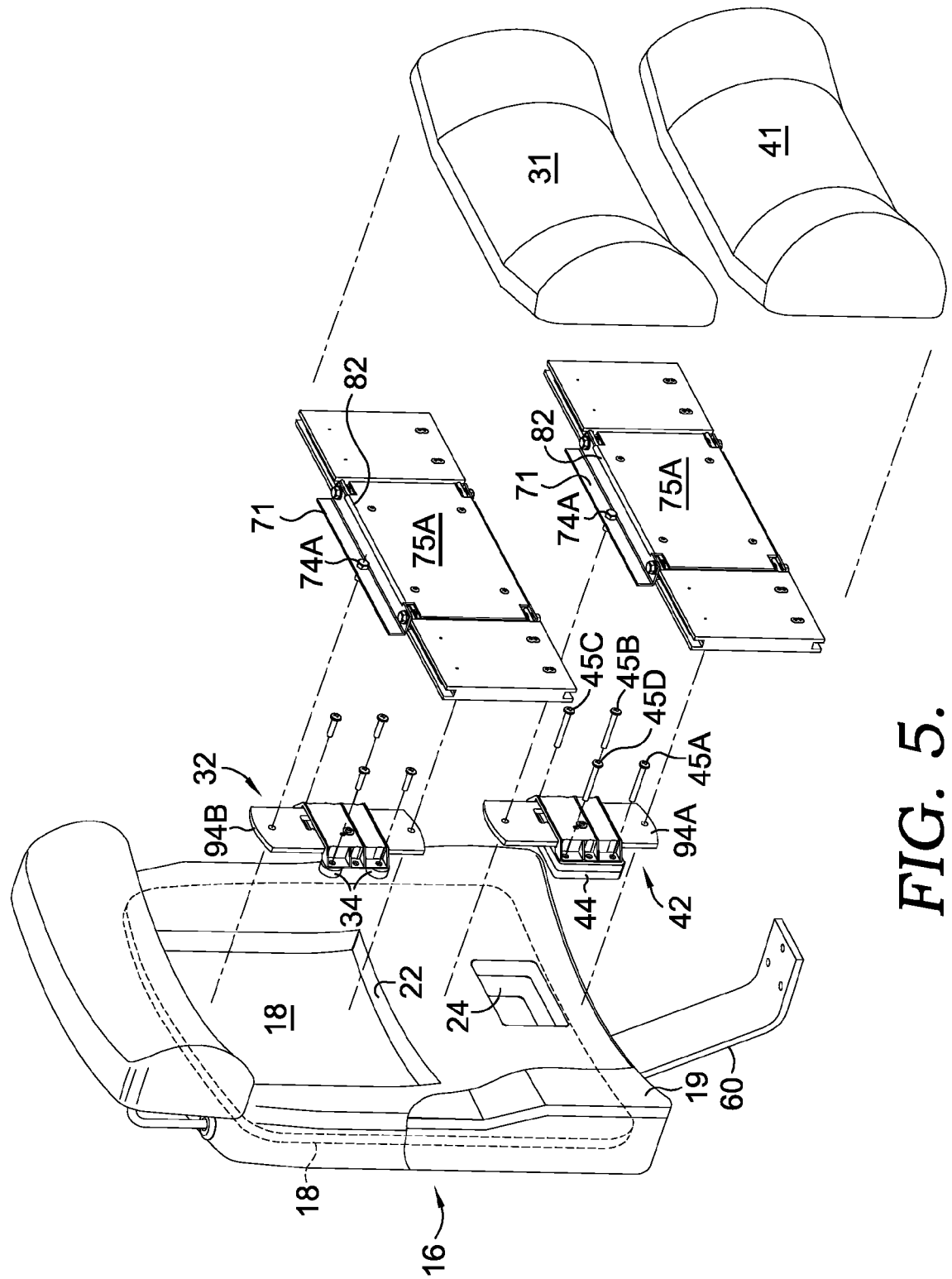
FIG. 5 is an exploded front view of a back of a chair, which illustrates components of user support assemblies.
Figure 6:
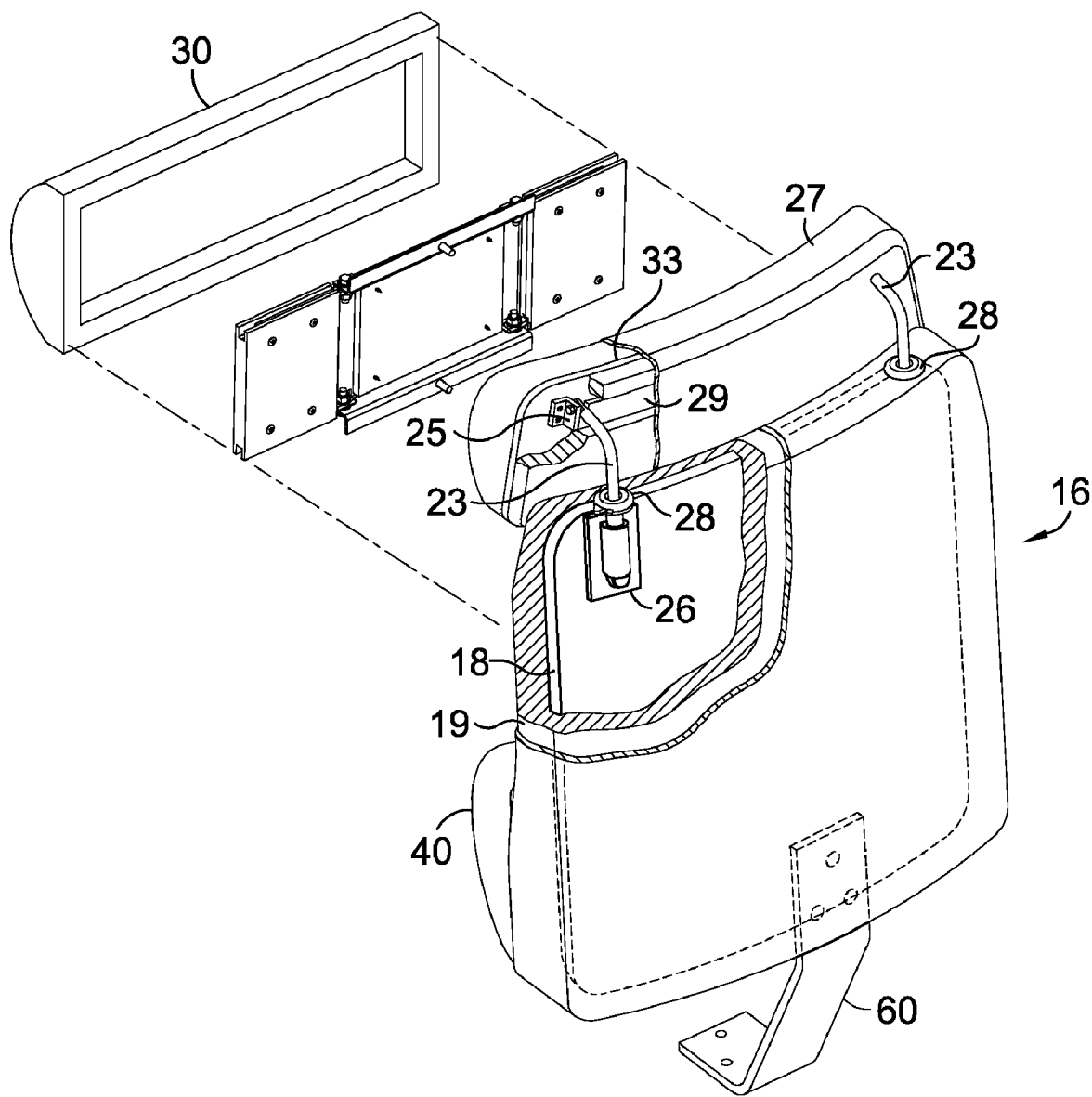
FIG. 6 is a rear view of a back of a chair showing part of a thoracic support assembly in an exploded view, showing a cutout view of the back, and showing a cutout view of a head rest assembly.

As shown in FIGS. 3-5, in one embodiment, the thoracic support assembly 30 and lumbar support assembly 40 each include a crescent-shaped cushion 31 and 41 (respectively) coupled to the central skin, right-side skin, and left-side skin. A combination crescent-shaped cushion and assembly for pivotally rotating sides is illustrated in FIGS. 7 and 8. In one aspect, cushions 31 and 41 are coupled to a central skin, right-side skin, and left-side skin to enable pivotal rotation forward and backward. For example, cushions might be coupled to skins by an adhesive means, such as glue, which is only applied in certain areas so as not to interfere with rotation. A crescent-shaped cushion fits contours of a user's body. For example, crescent-shaped cushions may fit contours of a user's spinal curvature, as can be seen in FIGS. 1 and 2.

Also coupled to the central mounting base 18 is a head support assembly 20. As shown best in FIG. 6, one or more post guide mounting plates 26 with a guide cylinder is coupled to the central mounting base 18. A barbed post guide 28 is inserted into the guide cylinder of each post guide mounting plate 26. Accordingly, each barbed post guide 28 includes a shaft insertable into a guide cylinder and each shaft includes reducible barbs at the end thereof for obstructing removal of the shaft from the guide cylinder. Each barbed guide post 28 extends from the guide cylinder and through the slip cover, such that a lip of the barbed guide post 28 is positioned external to the slip cover. In addition, one or more of the barbed post guides 28 includes a mechanism for operatively engaging a head rest post 23 inserted through a center of the barbed post guide 28. For example, in one aspect a barbed guide post 28 includes a ketch extending into its center, which operatively engages a head rest post 23. Head rest post 23 includes a set of grooves (not shown), which engage the ketch. The grooves are spaced apart at different distances allowing for adjustment of the headrest to different heights.

Each of the one or more head rest posts 23 are received by a barbed guide post 28 and extend out a top portion of the back 16. In one aspect, head rest posts 23 are angled and are attached at a terminal end to a corresponding head rest mounting bracket 25. The terminal end of each head rest post 23 and its corresponding head rest mounting bracket 25 include corresponding holes, which simultaneously receive a fastener. The fastener serves as an axis on which the head rest bracket 25 may rotate. In one embodiment, the fastener includes a combination of a bolt, one or more washers, and a locknut As shown in FIG. 6, a coupling plate 29 attaches to and extends between head rest mounting brackets to unify rotation of the head rest mounting brackets. Head rest brackets 25 are coupled to a rigid backing 33 fixed to the backside of a head rest cushion 27. As previously mentioned, the barbed post guide 28 includes a mechanism for operatively engaging the head rest post 23 and accordingly the head rest post 23 is securable at a desired height. Because the head rest post 23 is angled, the head rest cushion 27 is coupled in a plane separate from the back 16 and is positionable below a top portion of the back 16. In other aspects, the chair back 16 might be shaped so as to minimize or eliminate an angle in head rest post 23 but still enable head rest cushion 27 to be positioned below a top portion of the back 16.

In further embodiments the seat assembly 50 also includes an adjustment mechanism (not shown) coupled between the seat assembly 50 and the seat frame 14. The seat assembly adjustment mechanism enables horizontal adjustment of seat assembly 50 such that the seat depth of the chair can be set at a desired position. The seat assembly adjustment mechanism might comprise a seat slide mechanism, which is attached to a wood, plastic, or metal substrate arranged underneath the seat assembly 50.

In one embodiment, a chair 10 is provided with armrests 21 positioned atop armrest posts. An armrest 21 may include a top support surface 100 (depicted in FIGS. 11A-C) constructed to include multiple abutting surfaces. The top support surface 100 is upholstered with a foam pad for added comfort. FIGS. 11A-C illustrate a top support surface 100 for a right-side armrest 21. Each abutting surface of the top support surface 100 may be positioned at a different angle from other abutting surfaces. For example, the top support surface 100 may include a substantially horizontal surface 98, which abuts a surface 96 that is both declining and internally rotated. The top support surface is contoured to match a neutral posture of a user's arm at rest.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A seat comprising:
   a base assembly;
   a back coupled to the base assembly; and
   coupled to the back:
   (i) a lumbar support adjustment mechanism for independent, vertical adjustment of a lumbar support assembly;
   (ii) a thoracic support adjustment mechanism for independent, vertical adjustment of a thoracic support assembly; and
   (iii) a mechanism for independent, vertical adjustment of a head support assembly,
   wherein at least one of the lumbar support assembly and the thoracic support assembly comprises;
      a) a central mounting bracket that attaches to a respective adjustment mechanism;
      b) a left swing rod that pivotally couples a left-side skin to a left side of the central mounting bracket; and
      (c) a right swing rod that pivotally couples a right-side skin to a right side of the central mounting bracket.

2. The seat of claim 1,
   wherein the base assembly further comprises a seat chassis coupled to a seat adjustment mechanism for independent, horizontal adjustment of a seat assembly and
   wherein the seat assembly is horizontally adjustable to customize a depth of the seat assembly in relation to the back.

3. The seat of claim 2 wherein the seat assembly comprises a seat slider mechanism coupled to a substrate underneath the seat assembly.

4. The seat of claim 2 wherein one or more of the head support assembly, the thoracic support assembly, the lumbar support assembly, and the seat assembly comprise crescent-shaped cushions.

5. The seat of claim 1 wherein both the lumbar support assembly and the thoracic support assembly comprise rotatable side portions to adjust to a width of a user's back.

6. The seat of claim 1 wherein the back comprises a central mounting base and wherein the lumbar support adjustment mechanism, the thoracic support adjustment mechanism, and head support adjustment mechanism are coupled to the central mounting base.

7. The seat of claim 6 wherein the head support adjustment mechanism comprises:
   one or more angled head support posts, wherein the one or more angled head support posts are vertically adjustable, and
   a head support mounting bracket pivotally attached to a terminal end of each of the one or more angled head support posts, wherein the head support mounting bracket is fixed to a rigid backing of a head support cushion.

8. The seat of claim 1 further comprising armrests having a top support surface,
   wherein the top support surface comprises a plurality of abutting surfaces and
   wherein the plurality of abutting surfaces comprises a first substantially horizontal surface, which abuts a second surface having a both a declined orientation and an internally rotated orientation.

9. A chair comprising:
   a base assembly;
   a seat chassis coupled to the base assembly, wherein attached to the seat chassis is a horizontally adjustable seat assembly;
   a back coupled to the seat chassis, wherein the back comprises a central mounting base and wherein the central mounting base is coupled to the seat chassis by a mounting plate; and
   coupled to the central mounting base:

(i) a lumbar support adjustment mechanism for independent, vertical adjustment of a lumbar support assembly;
(ii) a thoracic support adjustment mechanism for independent, vertical adjustment of a thoracic support assembly; and
(iii) a head support adjustment mechanism for independent, vertical adjustment of a head support assembly,
wherein both the lumbar support assembly and the thoracic support assembly comprise:
  (a) a top central mounting bracket and a bottom central mounting bracket for attachment to an adjustment mechanism;
  (b) swing rods pivotally coupled to one or more of the top central mounting bracket and the bottom central mounting bracket, wherein at least one swing rod is pivotally coupled to a left side of the one or more of the top central mounting bracket and the bottom central mounting bracket and wherein at least one swing rod is pivotally coupled to a right side of the one or more of the top central mounting bracket and the bottom central mounting bracket; and
  (c) a left-side skin for unifying rotation of the at least one swing rod pivotally coupled to the left side and a right-side skin for unifying rotation of the at least one swing rod pivotally coupled to the right side.

10. The chair of claim 9 wherein one or more of the head support assembly, the thoracic support assembly, the lumbar support assembly, and the seat assembly comprise crescent-shaped cushions.

11. The chair of claim 9 wherein both the lumbar support assembly and the thoracic support assembly comprise rotatable side portions to adjust to a width of a user's back.

12. The chair of claim 9 wherein the head support adjustment mechanism comprises:
  one or more angled head support posts, wherein the one or more angled head support posts are vertically adjustable, and
  a head support mounting bracket pivotally attached to a terminal end of each of the one or more angled head support posts, wherein the head support mounting bracket is fixed to a rigid backing of a head support cushion.

13. The chair of claim 9 further comprising armrests having a top support surface,
  wherein the top support surface comprises a plurality of abutting surfaces and
  wherein the plurality of abutting surfaces comprises a first substantially horizontal surface, which abuts a second surface having a both a declined orientation and an internally rotated orientation.

14. A chair comprising:
a base assembly;
a seat chassis coupled to the base assembly, wherein attached to the seat chassis is a horizontally adjustable seat assembly;
a back coupled to the seat chassis, wherein the back comprises a central mounting base and wherein the central mounting base is coupled to the seat chassis by a mounting plate;
coupled to the central mounting base:
  (i) a lumbar support adjustment mechanism for independent, vertical adjustment of a lumbar support assembly;
  (ii) a thoracic support adjustment mechanism for independent, vertical adjustment of a thoracic support assembly; and
  (iii) a head support adjustment mechanism for independent, vertical adjustment of a head support assembly,
wherein one or more of the thoracic support assembly and the lumbar support assembly comprise:
  a top central mounting bracket and a bottom central mounting bracket for attachment to an adjustment mechanism;
  swing rods pivotally coupled to one or more of the top central mounting bracket and the bottom central mounting bracket, wherein at least one swing rod is pivotally coupled to a left side of the one or more of the top central mounting bracket and the bottom central mounting bracket and wherein at least one swing rod is pivotally coupled to a right side of the one or more of the top central mounting bracket and the bottom central mounting bracket; and
  a left-side skin for unifying rotation of the at least one swing rod pivotally coupled to the left side and a right-side skin for unifying rotation of the at least one swing rod pivotally coupled to the right side; and
wherein the head support adjustment mechanism comprises:
  one or more angled head support posts, wherein the one or more angled head support posts are vertically adjustable, and
  a head support mounting bracket pivotally attached to a terminal end of each of the one or more angled head support posts, wherein the head support mounting bracket is fixed to a rigid backing of a head support cushion.

* * * * *